INVENTOR
E. C. YOKEL
BY: James E. Nilles
ATTORNEY

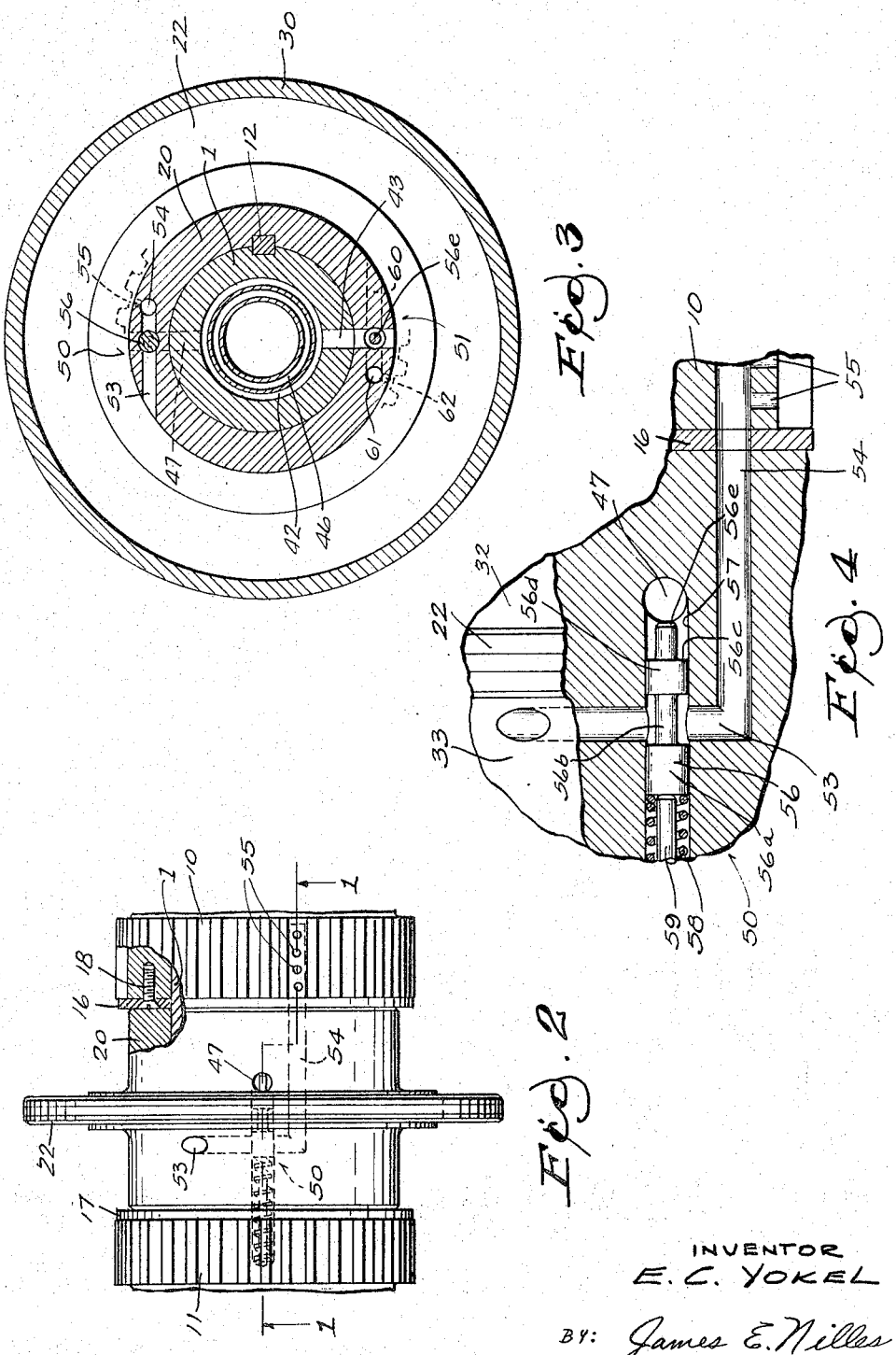

United States Patent Office 3,301,367
Patented Jan. 31, 1967

3,301,367
DOUBLE HYDRAULIC OPERATED CLUTCH HAVING LOW PRESSURE FLUID PLATE COOLING MEANS
Edward C. Yokel, Racine, Wis., assignor to Twin Disc Clutch Company, Racine, Wis., a corporation of Wisconsin
Filed Feb. 11, 1965, Ser. No. 431,804
6 Claims. (Cl. 192—113)

The present invention relates generally to double hydraulic operated clutch mechanism and, more specifically, to means for providing low pressure cooling fluid to the clutch plates being engaged.

Prior art clutches have been hertofore used wherein high pressure fluid is used to cool the plates. These devices have not been entirely satisfactory for a number of reasons: for example, this high pressure fluid if not properly and accurately controlled has a tendency to permit frictional heat to burn the plates. One example of the prior art which uses high pressure fluid directly from the cylinder being pressurized, so as to cool the plates, is the Ziabicki U.S. Patent No. 3,105,582, issued on October 1, 1963, and assigned to a common assignee with the present application.

In addition, some of the prior art devices continually lubricate the plates which also results in drag of the clutch in neutral because of torque which is transmitted due to viscous shear of the fluid. Other prior devices required a third source of fluid supply resulting in additional cost and maintenance in order to provide plate cooling or lubrication, and this lubrication was also usually of the continuous type.

The clutch mechanism provided by the present invention overcomes the above-mentioned shortcomings of the prior art. More specifically, the present mechanism provides a double, hydraulically operated clutch in which low pressure fluid from the chamber being exhausted is used to lubricate the opposite clutch plates being engaged. The arrangement is such that these plates are only lubricated at the commencement and during their engagement, but not when the clutch is in neutral. A spring-biased control piston is utilized which is not effective to admit low pressure fluid when the clutch is disengaged and in neutral.

Stated otherwise, when one clutch is being engaged due to high pressure fluid charging its actuating chamber, that high pressure fluid is also used to actuate a spring-biased control piston to permit some of the low pressure fluid to flow from the opposite chamber which is being exhausted to the clutch plates being engaged.

These and other objects and advantages of the present invention will appear hereinafter as this disclosure progresses, reference being had to the accompanying drawings, in which:

FIGURE 2 is a fragmentary elevational view of a portion of the FIGURE 1 device, certain parts being shown as removed or broken away for clarity;

FIGURE 3 is a transverse sectional view taken along line 3—3 in FIGURE 1; and

FIGURE 4 is a view similar to FIGURE 2, but on an enlarged scale, and showing a part further broken away and in section for clarity in the drawing.

Figure 1:
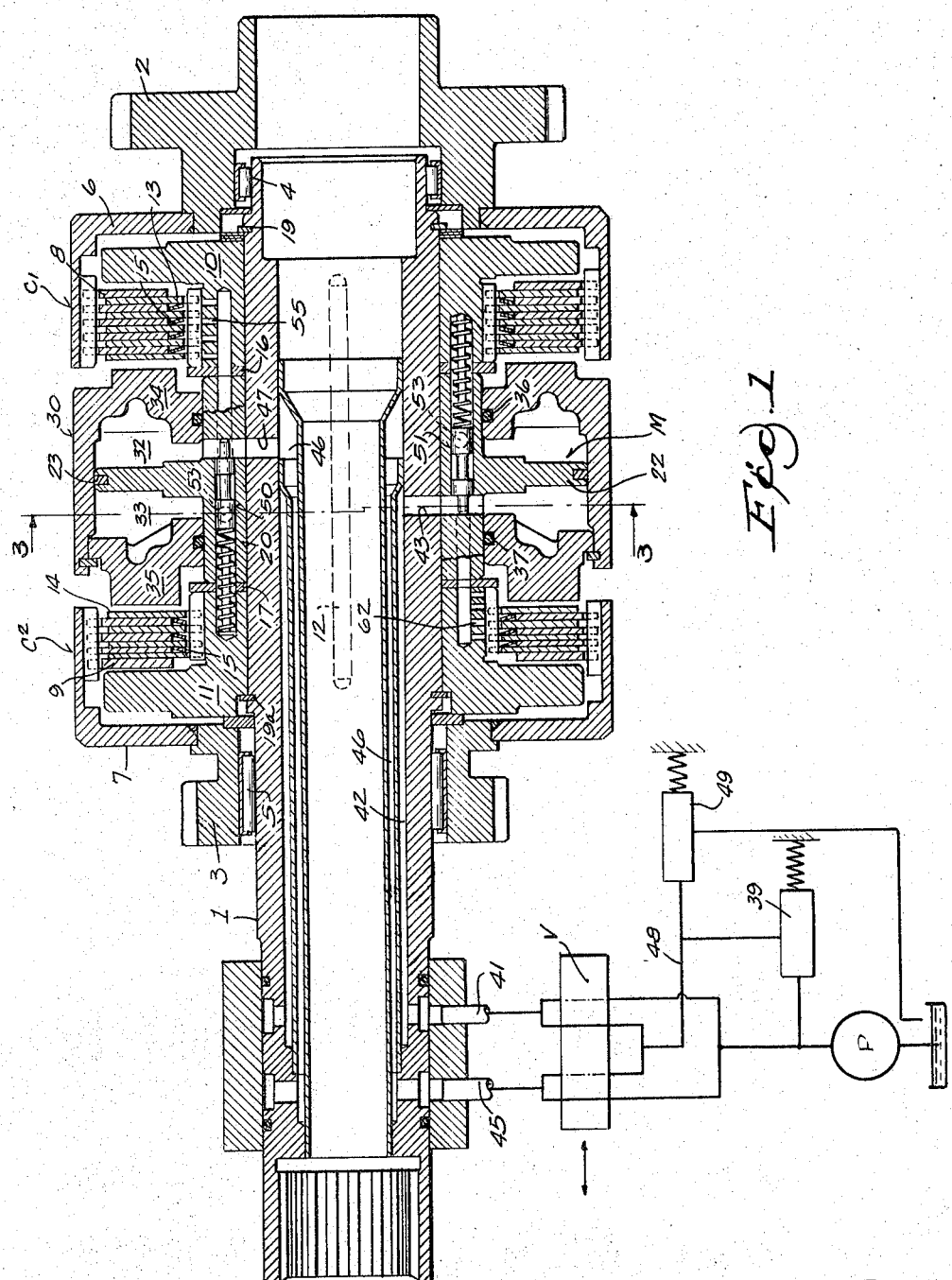
FIGURE 1 is a longitudinal, cross-sectional view through clutch mechanism embodying the present invention, the view being taken along line 1—1 in FIGURE 2.

Referring in greater detail to the drawings, the clutch mechanism has been shown for illustrative purposes as a pair of clutches C1 and C2 being mounted on an input shaft 1. A pair of driven output members in the form of gears 2 and 3 are suitably journalled for rotation on the shaft by antifritcion bearing means 4 and 5, respectively. The gears 2 and 3 are secured, as by welding, for example, to their respective clutch drums 6 and 7 which are internally splined to slidingly receive their clutch plates 8 and 9, respectively, in the conventional manner. Each of the clutches C1 and C2 also includes conventional hubs 10 and 11 which are fixed to shaft 1 by key means 12 and which have clutch plates 13, 14 splined thereto, respectively, for conventional interleaving with the corresponding plates of the clutch drums. Snap rings 19 and 19a hold their hubs 10 and 11 against axial displacement away from one another.

In order to hold the clutch plates 13 and 14 on their respective hubs during assembly and against the tendency of the Belleville springs 15 to push them off their hubs before assembly, large washers 16 and 17 may be provided which are secured by screws 18 to the inner ends of the hubs.

Located axially between the two clutches, more particularly against the inner ends of the clutch hubs, is a reaction member M which includes a sleeve 20 fixed to shaft 1 by the key means 12. Mounted centrally on the sleeve, and shown as formed integrally therewith, is a radially extending flange 22 having a sliding, oil ring seal 23 around it periphery. Thus, the sleeve and its flange and the clutch hubs 10 and 11 are all axially fixed to the shaft 1 for rotation therewith as a unit.

Mounted for sliding axially over the flange 22 and sleeve 20 is an annular casing 30 which forms a main force piston. The flange 22 of the reaction member divides the interior of the piston into two axially spaced fluid chambers 32 and 33. The end walls 34 and 35 of the main piston are adapted to slide over the periphery of the sleeve and are in slidable, sealing engagement therewith by means of the conventional seals 36 and 37, respectively. As the piston is moved axially in one direction or the other due to pressure fluid charging and being exhausted from the expansible chambers 32 and 33, the end walls 34 and 35 selectively bear against their adjacent clutch plates of the clutches C1 and C2, respectively, in the known manner, to engage or permit disengagement thereof.

Pressure fluid is supplied from a pump P, and a high pressure (say 200 p.s.i., for example) regulating valve 39 maintains the pressure of the fluid which goes through a selector valve V and then either via conduit 41, axial passage 42 in shaft 1, and cross port 43 into chamber 33, or via conduit 45, axial passage 46, and cross port 47 into chamber 32. When one chamber is being charged with high pressure fluid, the other is being exhausted via the same passages 41 or 45 through which it is at other times charged with pressure fluid, as will appear.

In accordance with the present invention, some of the fluid which is being exhausted from the contracting chamber is directed axially and over to the opposite clutch plates which are then being engaged, for cooling thereof. This fluid transfer takes place through valve means, which means is actuated by the high pressure fluid which is then charging the expanding chamber. Then the plates are continued to be cooled during engagement by lubrication fluid of low pressure which flows through the opened valve means. The structure and operation will now be described.

Located at diametrically opposed locations in the sleeve 20 are a pair of similar valve means 50, 51. As both valves are similar, a detailed description of only valve means 50 will be given.

When chamber 32 is being charged with high pressure fluid via port 47, valve means 50 permits low pressure fluid to go from chamber 33, via transverse passage 53, axial passage 54, and through the small cross ports 55 and into contact with the plates of clutch C1. This fluid flow occurs because a spring-biased, double piston valve element 56 in axial bore 57 (clearly shown in FIGURE 4) is shifted to the left (as viewed in the drawings) against the action of the spring 58 so that the land 56a of the piston 56 moves out of its normal blocking position across the passage 53. This permits some of the low pressure fluid in chamber 33 to flow past the groove portion 56b of the piston 56 and into contact with the plates of clutch C1. This shifting of the piston 56 to the valve open position occurs because of the high pressure fluid in port 47 acting on the end 56c of the land 56d of the piston 56, which end is exposed in port 47. The relatively widely spaced lands 56a and 56d assure smooth operation of the valve, and more pressure is required to shift the valve and open the lubrication passage than is available during lubrication oil clutch pack pressure of disengaged and neutral. A stop 59 limits the piston travel to the left, as viewed in the drawings, and the piston end 56e can abut against the wall of port 47 to limit the piston travel in the other direction.

Thus, passages 53, 54, and 55 form an exhaust port for some of the fluid being expelled from the contracting chamber 33.

The remainder of the fluid being discharged from the chamber 33 exhausts via port 43, passage 42, and back through the conventional four-way selector valve V, through conduit 48, and through the low pressure regulating valve 49. This exhaust flow occurs while the shift of the clutch mechanism is in progress, after which this exhaust flow of fluid ceases, and the chamber 33 is then maintained full of low pressure fluid for lubrication of the opposite clutch plates via the exhaust port as described. This flow of low pressure fluid into chamber 33 is sustained by the discharge from the 200 p.s.i. valve 39.

It will be understood that the structure and function of valve means 51 is similar to means 50 but that it permits some of the exhaust fluid to flow from chamber 32 when chamber 33 is being pressurized, via an exhaust port comprising transverse passage 60, axial passage 61, and through a series of small holes 62 to cool the clutch plates of the clutch C2 which is axially remote from chamber 32.

With the present invention, low pressure fluid is used to maintain the chamber which is not being pressurized in a fully charged position, and in addition, the low pressure fluid immediately begins to cool the opposite clutch plates which are being engaged. This cooling continues during clutch engagement. When the clutch is in neutral, however, there is no flow of this low pressure fluid past the plates which would otherwise cause the clutch to creep.

Various modes of carrying out the invention are contemplated as being within the scope of the following claims particularly pointing out and distinctly claiming the subject matter which is regarded as the invention.

I claim:

1. A hydraulically operated clutch mechanism comprising a pair of axially spaced clutches having a common shaft; a main force piston axially shiftable on the shaft between said clutches for selective actuation thereof; an annular reaction member within said force piston and fixed on said shaft to define a pair of large, variable volume, pressure fluid chambers, one adjacent each clutch whereby expansion of a chamber actuates the adjacent clutch; a relatively high pressure fluid supply passage for each of said chambers; a relatively low pressure fluid exhaust port between each of said chambers and the clutch plates of the clutch axially remote therefrom; and valve means in each of said exhaust ports, said valve means being exposed to the supply passage of the opposite chamber and shifted by high pressure fluid therein to an exhaust port open position to thereby permit low pressure fluid to flow from its associated chamber being contracted and through its exhaust port and to said opposite clutch plates which are being engaged due to expansion of the adjacent chamber.

2. Mechanism as defined in claim 1 further characterized in that said reaction member comprises a sleeve fixedly mounted on said shaft and a radial flange extending rigidly from said sleeve intermediate the length of the latter, and said main force piston is axially slidable on said sleeve.

3. Mechanism as defined in claim 2 further characterized in that said exhaust ports are located in said sleeve.

4. Mechanism as defined in claim 3 further characterized in that a portion of said fluid supply passage extends through said sleeve and said valve means is exposed to said portion whereby high pressure fluid can cause actuation of said valve means.

5. Mechanism as set forth in claim 1 further characterized in that said valve means comprises a reciprocating piston, and resilient means to bias said piston toward a position in which it blocks flow through its exhaust port.

6. A hydraulically operated clutch mechanism comprising a pair of axially spaced clutches having a common shaft; a main force piston axially shiftable on the shaft between said clutches for selective actuation thereof; an annular reaction member within said force piston and including a sleeve fixed on said shaft and a radial flange extending from said sleeve to define a pair of expansible chambers, one adjacent each clutch whereby expansion of a chamber actuates the adjacent clutch; a relatively high pressure fluid supply passage for each of said chambers and extending through said sleeve; a pair of relatively low pressure fluid exhaust ports located in said sleeve, one extending between each of said chambers and the clutch plates of the clutch axially remote therefrom; and a reciprocable piston valve means in each of said exhaust ports, means for resiliently biasing the valve means to an exhaust port closed position, said valve means being exposed to the supply passage of the opposite chamber and shifted by high pressure fluid therein to an exhaust port open position to thereby permit low pressure fluid to flow from its associated chamber when the latter is being contracted and through its exhaust port and to said opposite clutch plates which are being engaged due to expansion of the adjacent chamber.

References Cited by the Examiner

UNITED STATES PATENTS 2,386,220 10/1945 Lawler et al. _____ 192—87 X
3,017,006 1/1962 Dence et al. _____ 192—113.2

DAVID J. WILLIAMOWSKY, *Primary Examiner.*

B. W. WYCHE, *Assistant Examiner.*